US012728561B2

(12) United States Patent
Wang

(10) Patent No.: US 12,728,561 B2
(45) Date of Patent: Sep. 8, 2026

(54) ARMREST PRODUCTION PROCESS AND ARMREST

(71) Applicant: Sj industries Inc., Majuro (MH)

(72) Inventor: Kunjie Wang, Fuzhou (CN)

(73) Assignee: Sj industries inc., Majuro (MH)

( * ) Notice: Subject to any disclaimer, the term of this patent is extended or adjusted under 35 U.S.C. 154(b) by 282 days.

(21) Appl. No.: 18/515,310

(22) Filed: Nov. 21, 2023

(65) Prior Publication Data

US 2025/0162191 A1 May 22, 2025

(51) Int. Cl.
*B27M 3/18* (2006.01)
*A47C 7/54* (2006.01)

(52) U.S. Cl.
CPC ................. *B27M 3/18* (2013.01); *A47C 7/54* (2013.01)

(58) Field of Classification Search
CPC ................................... B27M 3/18; A47C 7/54
See application file for complete search history.

(56) References Cited

U.S. PATENT DOCUMENTS 6,582,021 B1 * 6/2003 Chung ..................... B60N 2/75 297/411.46
7,438,360 B2 * 10/2008 Chung ..................... A47C 7/54 297/411.21
8,123,299 B2 2/2012 Lin
2007/0218243 A1 * 9/2007 Mak ........................ E04F 11/18 428/68
2011/0080030 A1 * 4/2011 Lin ........................ B27M 3/006 156/220

FOREIGN PATENT DOCUMENTS

CN 208624953 U * 3/2019 .......... B27M 3/0086

OTHER PUBLICATIONS

Translation of CN-208624953.*

* cited by examiner

*Primary Examiner* — Bobby Yeonjin Kim
(74) *Attorney, Agent, or Firm* — Bayramoglu Law Offices LLC

(57) ABSTRACT

An armrest production process includes the following steps: a. taking a woody first raw material, and cutting the first raw material into at least two lateral boards and an upper cover; and alternatively, taking a woody first raw material and a woody third raw material, cutting the first raw material into a plurality of lateral boards, and cutting the third raw material into a plurality of upper covers; b. taking a woody second raw material, and processing the second raw material into an inner core; c. splicing two lateral boards onto two sides of the inner core, respectively; d. splicing the upper cover onto upper surfaces of the inner core and the two lateral boards; and e. processing outer edges of the two lateral boards and an outer edge of the upper cover into an outline of an armrest. An armrest produced by the armrest production process is further provided.

9 Claims, 6 Drawing Sheets

ARMREST PRODUCTION PROCESS AND ARMREST

TECHNICAL FIELD

The present disclosure relates to a wooden armrest.

BACKGROUND

Traditional armrests are generally made of wood materials, but due to limited wood resources, it is a waste to make armrests entirely from a whole piece of wood.

United States (US) patent with the publication number of U.S. Pat. No. 7,438,360B2 provides a method for producing an armrest from an environmentally friendly wood-based composite material. The armrest includes a longitudinal core body, a top veneer layer, and two lateral veneer layers. The longitudinal core body is made of a lower-quality wood material, and has a non-planar top surface and two opposite lateral surfaces interconnecting said bottom and top surfaces and extending longitudinally. Said non-planar top surface rises upwardly from said lateral surfaces to a middle of said top surface. The top veneer layer is made of a higher-quality wood material, and has a top surface, and a bottom connecting surface adhered to said top surface of said core body. Each of said top surface of said top veneer layer and said bottom connecting surface has substantially the same outline as that of said top surface of said core body. Each lateral veneer layer is made of a material similar to that of said top veneer layer.

US patent U.S. Pat. No. 8,123,299B2 provides a method for preparing an armrest. The method includes: preparing a surface portion made of a material the same as the plurality of core sections and bonding the surface portion to the core, with the surface portion including a plurality of upper boards and a plurality of lateral boards, with each of two adjacent ends respectively of two adjacent upper boards having a first, planar, engaging face, with each of two adjacent ends respectively of two adjacent lateral boards having a second, planar engaging face, with each of the plurality of lateral boards having a height the same as that of the lateral face of each of the plurality of core sections, with each of the plurality of upper boards having a width the same as a sum of a width of the top face of each of the plurality of core sections and two times of a width of the plurality of core sections.

The above US patents disclose that the core sections are spliced with the surface boards to form the armrest, but there still exist the following technical problems.

1. Even for similar materials, different woods do have differences in surface texture, density, luster, color difference, and porosity, such that the upper boards and the lateral boards of the spliced surface layer vary in texture, color difference, and other factors, thereby affecting the appearance quality.
2. After the lateral surfaces are prepared and the upper boards are bonded to the core sections, there is a further step to shape the outline of the armrest. This step requires removing a significant amount of wood material, resulting in wood waste.

SUMMARY

An objective of the present disclosure is to provide an armrest production process and an armrest to solve at least one of the existing technical problems.

In order to achieve the above objective, the present disclosure provides an armrest production process. The armrest production process includes the following steps: a. taking a woody first raw material, and cutting the first raw material into at least two lateral boards and an upper cover; and alternatively, taking a woody first raw material and a woody third raw material, cutting the first raw material into a plurality of lateral boards, and cutting the third raw material into a plurality of upper covers; b. taking a woody second raw material, and processing the second raw material into an inner core; c. splicing two lateral boards onto two sides of the inner core, respectively; d. splicing the upper cover onto upper surfaces of the inner core and the two lateral boards; and e. processing outer edges of the two lateral boards and an outer edge of the upper cover into an outline of an armrest.

Preferably, the armrest production process further includes: cutting the first raw material into at least one set of lateral boards, where the first raw material has a rectangular cross-section, and each set of lateral boards includes two lateral boards; and setting an oblique line between the two lateral boards of each set as a first cutting line.

Further, the armrest production process further includes: dividing a first side of the first raw material into the upper cover, and dividing a second side of the first raw material into the two lateral boards; setting a straight line between the upper cover and the two lateral boards as a second cutting line; and cutting along the first cutting line and the second cutting line to obtain the upper cover and the two lateral boards that are separate.

In an embodiment, a cross-section of the lateral board is a right trapezoid, where the right trapezoid is enclosed by a short base, a vertical leg, a long base, and an oblique leg; the two lateral boards are inverted such that the oblique legs of the two lateral boards coincide; and the first cutting line forms the oblique leg.

Preferably, step c further includes: when the two lateral boards are spliced onto the two sides of the inner core, respectively, connecting the vertical legs of the right trapezoids to the inner core, and positioning the oblique legs of the right trapezoids at the outer edges.

Further, an angle formed by the oblique leg and the vertical leg of the lateral board is 10-15°; and a length of the upper cover is L1, and a distance between edges of the two lateral boards is L2, where $L1<L2$.

Further, step d further includes: processing upper and lower surfaces of the two lateral boards and the inner core, such that the upper surfaces of the two lateral boards are flush with the upper surface of the inner core and the lower surfaces of the two lateral boards are flush with the lower surface of the inner core; and splicing the upper cover onto the upper surfaces of the inner core and the two lateral boards.

Preferably, the armrest production process further includes: performing plane cutting along the upper surfaces of the two lateral boards and the inner core, with a height of 3-5 mm cut away from upper portions of the inner core and the two lateral boards to allow the upper surfaces of the two lateral boards and the inner core to be flush; and performing plane cutting along the lower surfaces of the two lateral boards and the inner core, with a height of 3-5 mm cut away from lower portions of the inner core and the two lateral boards to allow the lower surfaces of the two lateral boards and the inner core to be flush.

Further, a material grade of the first raw material is same as a material grade of the third raw material, and the material grade of the first raw material is above a material grade of the second raw material.

Preferably, the material grade of the first raw material and the material grade of the third raw material are AA-grade, and the material grade of the second raw material is BB-grade.

Preferably, the armrest production process further includes: splicing a plurality of pieces of second raw materials into the inner core by bonding, mortise and tenon connection, bolt connection or tooth connection, where the second raw material is a leftover material, a finger-jointed wood material or a laminated wood material.

The present disclosure further provides an armrest. The armrest includes a plurality of armrest segments connected longitudinally, where each of the armrest segments includes the inner core, the upper cover, and the two lateral boards; the upper cover and the two lateral boards are prepared by cutting the woody first raw material; alternatively, the two lateral boards are prepared by cutting the woody first raw material, and the upper cover is prepared by cutting the woody third raw material; the inner core is prepared by processing the woody second raw material; the two lateral boards are spliced onto the two sides of the inner core; the upper cover is spliced onto the upper surfaces of the inner core and the two lateral boards; and the outer edges of the two lateral boards and the outer edge of the upper cover are formed into the outline of the armrest.

With the Above Method, the Present Disclosure has the Following Beneficial Effects:

1. In the present disclosure, the surface texture, density, luster, color difference, porosity, etc. of at least two lateral surfaces of the armrest are the same, so the finished product has high appearance quality.
2. In the present disclosure, the production process can reduce the amount of raw materials and reduce the material cost.
3. In the present disclosure, the second raw material is prepared by splicing a leftover material, a finger-jointed wood material or a laminated wood material, fully utilizing existing waste resources and achieving the reuse of resources.

REFERENCE NUMERALS

1. upper cover; 2. lateral board; 21. short base; 22. vertical leg; 23. long base; 24. oblique leg; 3. inner core; 4. first raw material; 5. second raw material; and 6. third raw material.

DETAILED DESCRIPTION OF THE EMBODIMENTS

To help those skilled in the art to better understand the technical solutions of the present disclosure, the present disclosure will be further described in detail below with reference to the drawings and specific embodiments.

Embodiment 1

Figure 9:
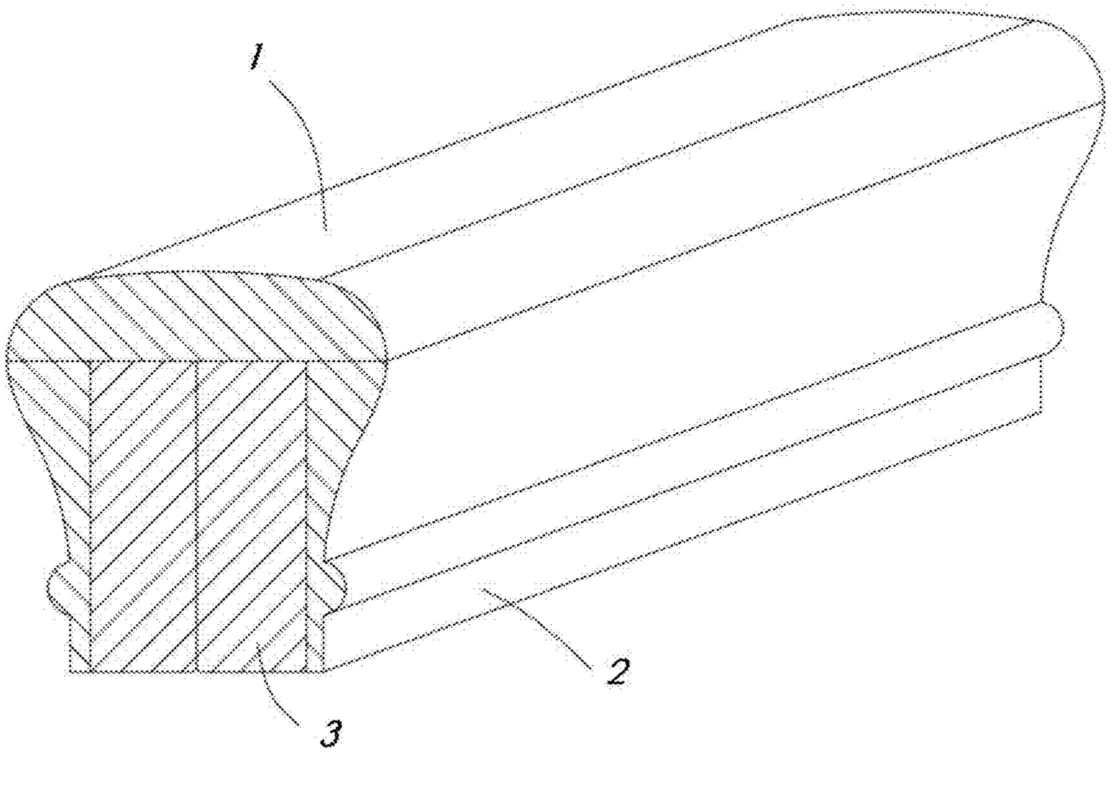
FIG. 9 is a structural diagram of an armrest according to the present disclosure.

The embodiment provides an armrest. The armrest includes a plurality of armrest segments connected longitudinally. As shown in FIG. 9, each of the armrest segments includes inner core 3, upper cover 1, and two lateral boards 2. The upper cover 1 and the two lateral boards 2 are prepared by cutting a piece of first raw material 4. The inner core 3 is prepared by processing second raw material 5. The two lateral boards 2 are spliced onto two sides of the inner core 3. The upper cover 1 is spliced onto an upper surface of the inner core 3 and upper surfaces of the two lateral boards 2. Outer edges of the two lateral boards 2 and an outer edge of the upper cover 1 are formed into an outline of the armrest.

The first raw material 4 is a high-grade wood material, such as an AA-grade wood material. The upper cover 1 and the two lateral boards 2 are made by cutting the first raw material 4. The upper cover and the two lateral boards are made of the same piece of wood material, they have the same surface texture, density, luster, color difference, porosity, etc. Therefore, there is basically no difference in texture or color difference between the upper cover 1 and the two lateral boards 2 spliced onto a surface layer, thereby ensuring high appearance quality.

The second raw material 5 can be made of a low-grade wood material, such as a BB-grade wood material. Alternatively, the second raw material 5 can be made of a leftover material, a finger-jointed wood material or a laminated wood material of an AA- or BB-grade wood material.

In this embodiment, a production process of the armrest includes the following steps.

a. The upper cover and the two lateral boards are processed.

The woody first raw material 4 is taken and cut to form the upper cover 1 and the two lateral boards 2. Due to the fact that the upper cover 1 and the two lateral boards 2 are located on an outer surface of the armrest, they are made of a high-grade wood material such as an AA-grade wood material.

Figure 1:
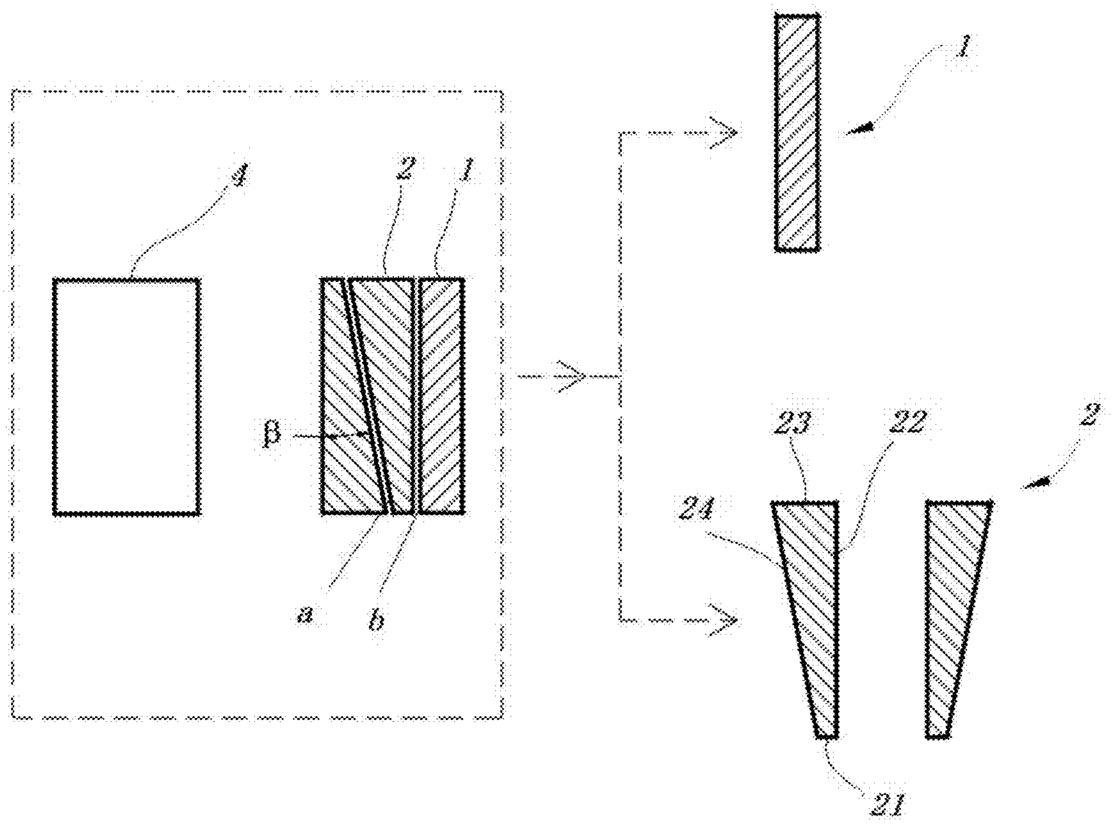
FIG. 1 is a schematic diagram of step a of an armrest production process according to Embodiment 1 of the present disclosure.

As shown in FIG. 1, in this embodiment, the first raw material 4 has a rectangular cross-section. A first side of the rectangular cross-section is divided into the upper cover 1, and a second side of the rectangular cross-section is divided into the two lateral boards 2.

First cutting line a is set between the two lateral boards 2, and second cutting line b is set between the upper cover 1 and the two lateral boards 2. Thus, the first raw material is cut along the second cutting line b and the first cutting line a to form the upper cover 1 and the two lateral boards 2 that are separate.

In relevant art, the cross-section of the lateral board 2 is rectangular. Thus, during step e, more wood will be removed from the outline, requiring a larger area of the first raw material 4, thereby increasing the cost. As shown in FIG. 1, in this embodiment, the cross-section of the lateral board 2 is a right trapezoid enclosed by short base 21, vertical leg 22, long base 23, and oblique leg 24. An angle formed by the oblique leg 24 and the vertical leg 22 of the lateral board 2 is $\beta$=10-15°. The two lateral boards 2 are inverted such that the oblique legs 24 of the two lateral boards coincide. The first cutting line b forms the oblique leg 24.

The upper cover 1 and the two lateral boards 2 are prepared by cutting the same piece of first raw material 4, ensuring that the surface texture, density, luster, color difference, porosity, etc. of the upper cover 1 and the two lateral boards 2 are the same, avoiding surface differences of the finished product and improving the appearance quality of the finished product. The two lateral boards 2 are right trapezoids, and the two lateral boards 2 are inverted. Thus, cutting according to the oblique leg 24 avoids the need for a large size of the first raw material 4, thereby reducing the material cost.

b. The inner core is processed.

Figure 2:
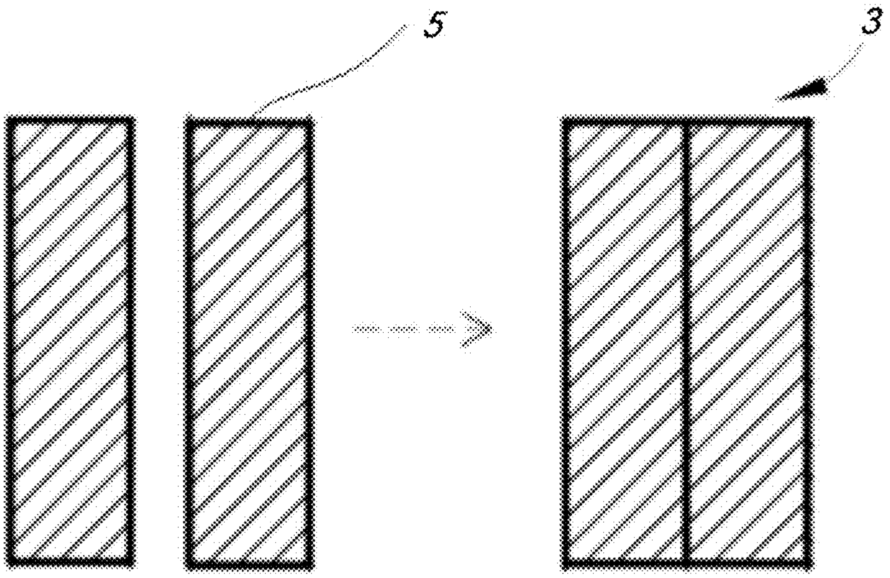
FIG. 2 is a schematic diagram of step b of the armrest production process according to the present disclosure.

As shown in FIG. 2, a plurality of pieces of second raw materials 5 are taken and processed into the inner core 3. The inner core 3 is located inside the armrest and can be made of low-grade materials, such as BB-grade wood materials, to greatly reduce costs. Alternatively, the second raw materials 5 can be made of a leftover material, a finger-jointed wood material or a laminated wood material according to length, width, and height requirements of the inner core 3.

The leftover material refers to a reasonable amount of remaining waste, scrap, and offcut materials that are not completely consumed within an original plan or design during the production process but are not suitable for producing another finished product.

The finger-jointed wood material is prepared by a finger-jointing machine through specific steps such as rack shaping, tenoning, and splicing of short- and medium-sized building wood materials. It is a long-size longitudinally glued combination of building wood materials.

The laminated wood material, also known as a glued wood material, is a material prepared by bonding a plurality of wood boards with adhesive.

The second raw materials are spliced through a multitude of methods, such as bonding, mortise and tenon connection, bolt connection, and tooth-jointing. By splicing the waste wood materials to form the inner core, the present disclosure fully utilizes existing waste resources and achieves the reuse of resources.

Figure 3:
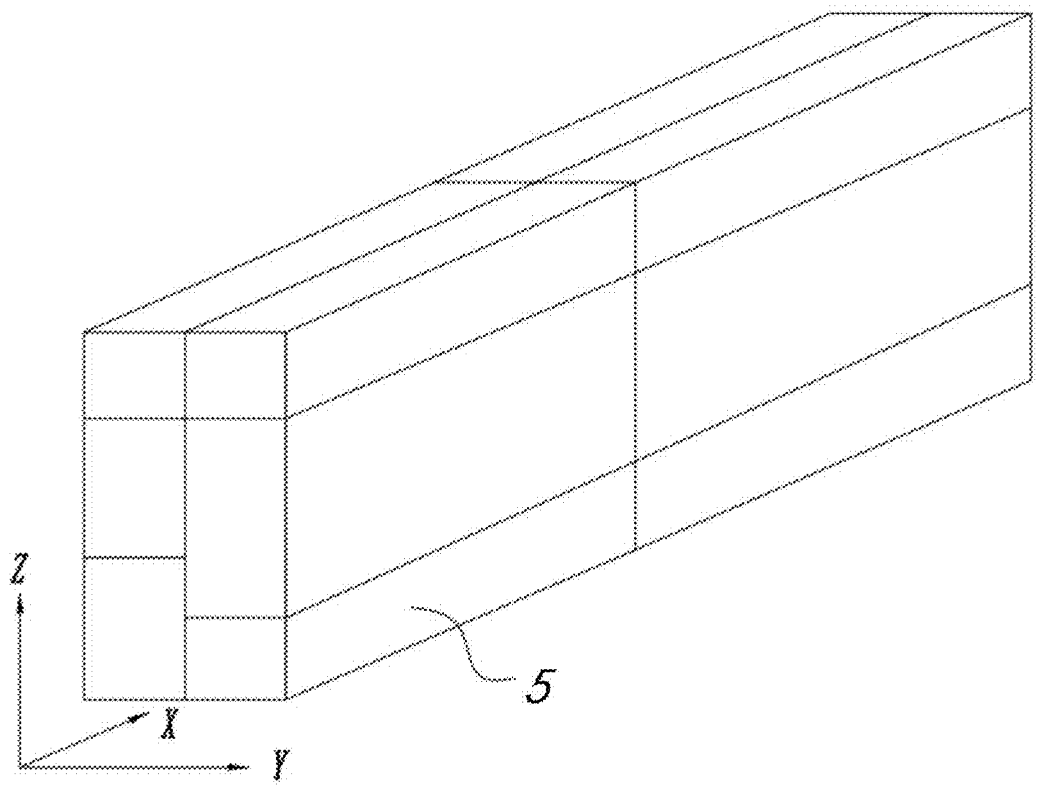
FIG. 3 is a schematic diagram of splicing an inner core according to an implementation.
Figure 4:
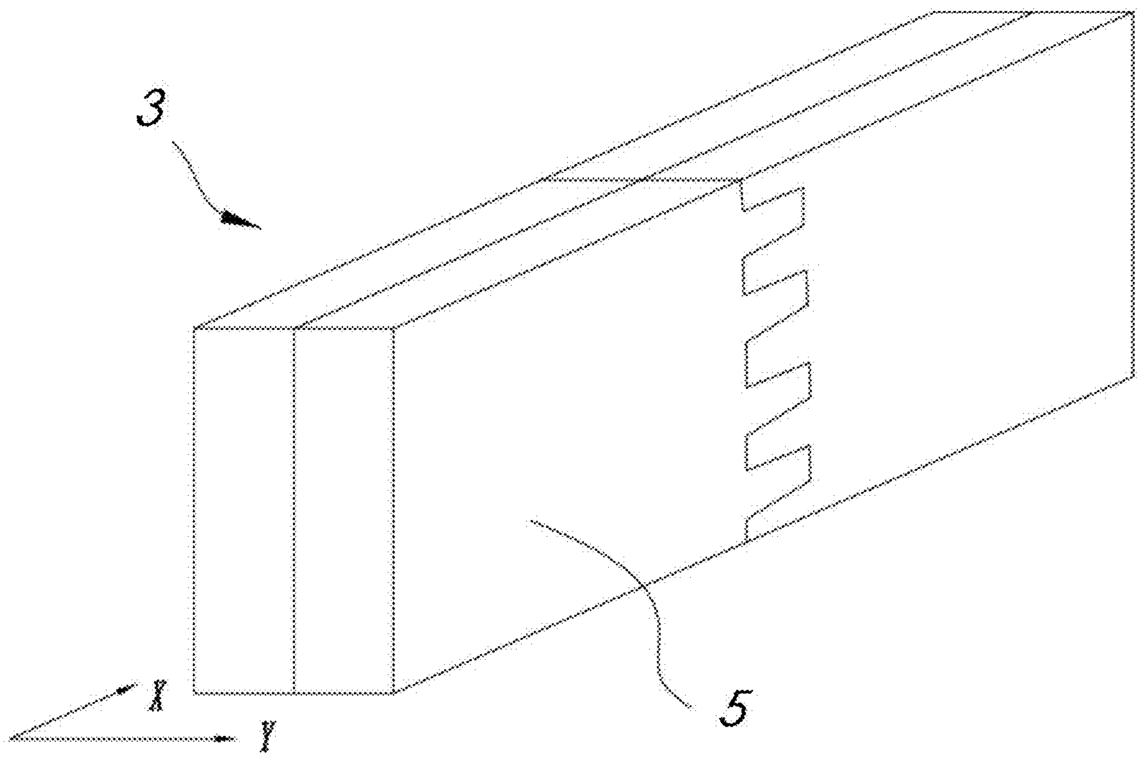
FIG. 4 is a schematic diagram of splicing an inner core according to another implementation.

As shown in FIG. 3, the second raw materials 5 are spliced in three directions: length direction (X-direction), width direction (Y-direction), and height direction (Z-direction). FIG. 3 shows the splicing in three directions, while FIG. 4 shows the splicing only in the length and width directions, where tooth-jointing is performed in the length direction and butt-jointing is performed in the width direction. Of course, in other embodiments, other methods of splicing can also be adopted based on the shape of the waste material.

c. The two lateral boards are spliced onto the two sides of the inner core.

Figure 5:
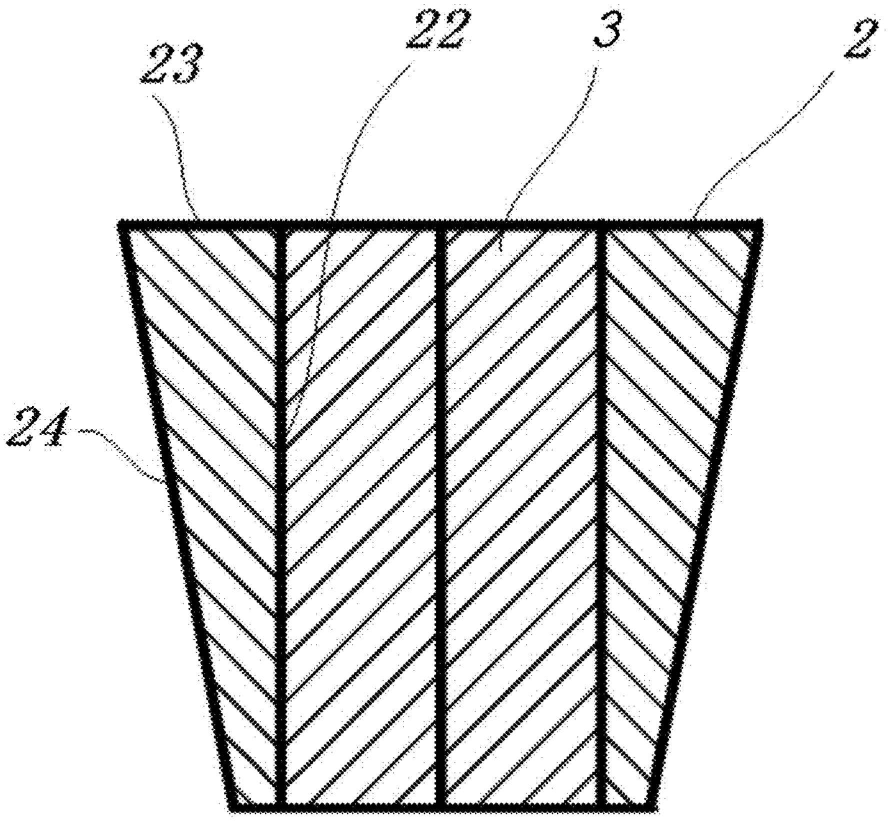
FIG. 5 is a schematic diagram of step c of the armrest production process according to the present disclosure.

As shown in FIG. 5, when the two lateral boards 2 are spliced onto the two sides of the inner core 3, the long base 23 of the right trapezoid is aligned with the upper surface of the inner core 3, the vertical leg 22 is connected to the inner core 3, and the oblique leg 24 is located at the outer edge.

d. The upper cover is spliced onto the upper surface of the inner core and the upper surfaces of the two lateral boards.

Figure 6:
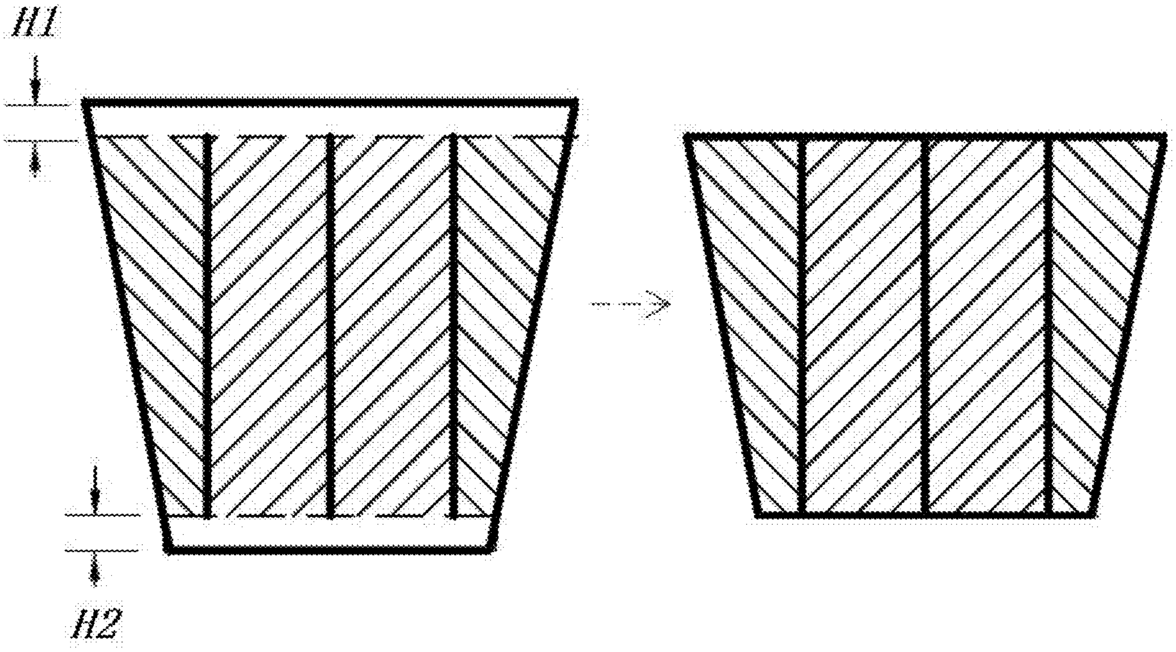
FIG. 6 is a schematic diagram of plane cutting along upper and lower surfaces of two lateral boards and the inner core in step d of the armrest production process according to the present disclosure.

As shown in FIG. 6, plane cutting is performed along the upper surfaces of the two lateral boards 2 and the upper surface of the inner core 3, with a height of H1 cut away from upper portions of the inner core 3 and the two lateral boards 2 to ensure that these upper surfaces are flush. Then plane cutting is performed along lower surfaces of the two lateral boards 2 and the inner core 3, with a height of H2 cut away from lower portions of the inner core 3 and the two lateral boards 2 to ensure that these lower surfaces are flush. The height H1 and the height H2 can be 3-5 mm. Through the plane cutting, the upper surfaces of the lateral board 2 and the inner core 3 are flush, and the lower surfaces of the lateral board and the inner core is flush.

Figure 7:
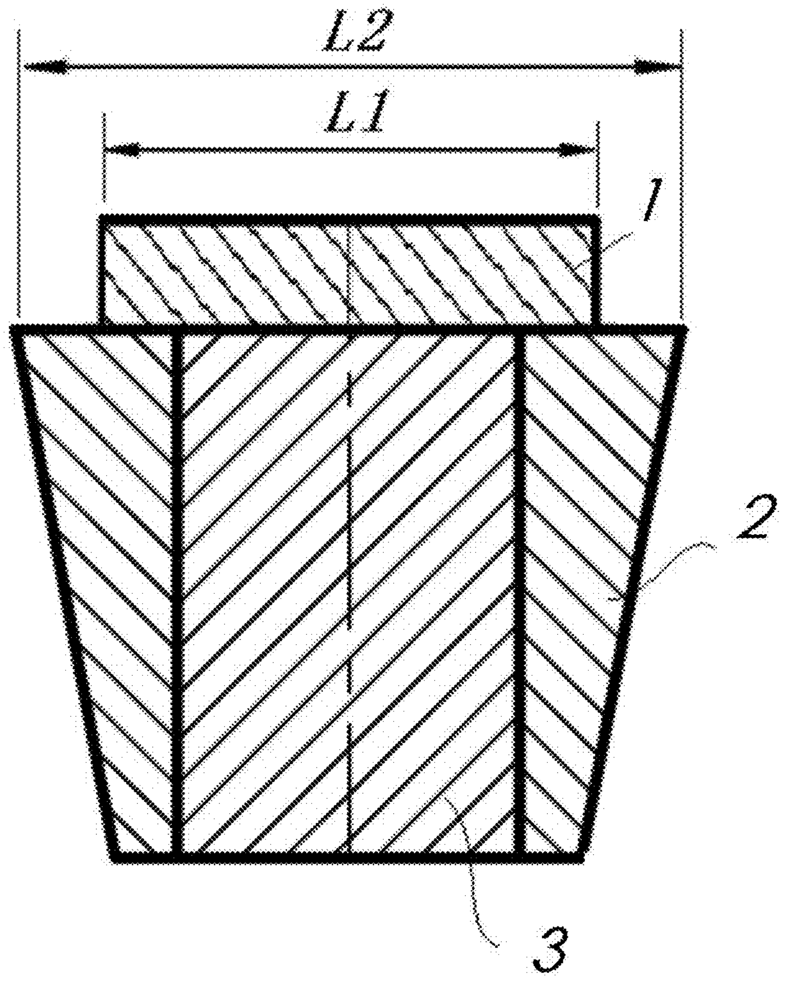
FIG. 7 is a schematic diagram of splicing an upper cover in step d of the armrest production process according to the present disclosure.

As shown in FIG. 7, the upper cover 1 is spliced on the upper surfaces of the lateral board 2 and the inner core 3, with the upper cover 1 located in a central position. A length of the upper cover 1 is L1, and a distance between the edges of the two lateral boards 2 is L2, where L1<L2. The length of the upper cover 1 is smaller than the distance between the edges of the two lateral boards 2. Thus, during the final shaping of the outline, a small area of the wood material is removed, reducing waste and saving costs.

e. The armrest is formed.

Figure 8:
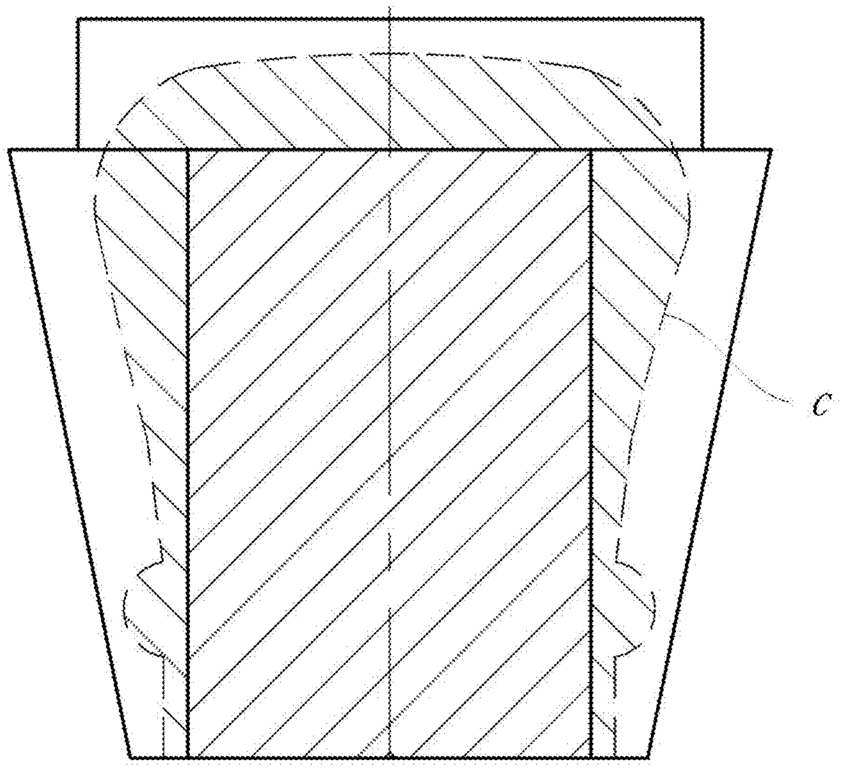
FIG. 8 is a schematic diagram of step e of the armrest production process according to the present disclosure.

As shown in FIG. 8, an outline line of the two lateral boards 2 and the upper cover 1 is indicated by dashed line c in the figure. Cutting is performed along the outline line to remove the wood material outside the outline line, thereby forming a finished product as the armrest.

In the present disclosure, the processing order of the production process can be changed, such as in the order of a-b-c-d-e or in the order of b-a-c-d-e. A finished armrest segment is shown in FIG. 9, and it can be longitudinally connected to form the armrest.

Embodiment 2

This embodiment provides an armrest. The difference between this embodiment and Embodiment 1 is that in this embodiment, lateral boards 2 are prepared by cutting woody first raw material 4, while the upper covers 1 are prepared by cutting woody third raw material 6.

The difference between a production process of the armrest in this embodiment and that in Embodiment 1 lies in step a. In this embodiment, step a is detailed as follows.

a. The upper covers and the lateral boards are processed.

Wooden first raw material 4 is taken and cut into a plurality of sets of lateral boards 2. Each set of lateral boards includes two lateral boards. Therefore, an even number of lateral boards, such as 2, 4, and 6 lateral boards, are formed.

Figure 10:
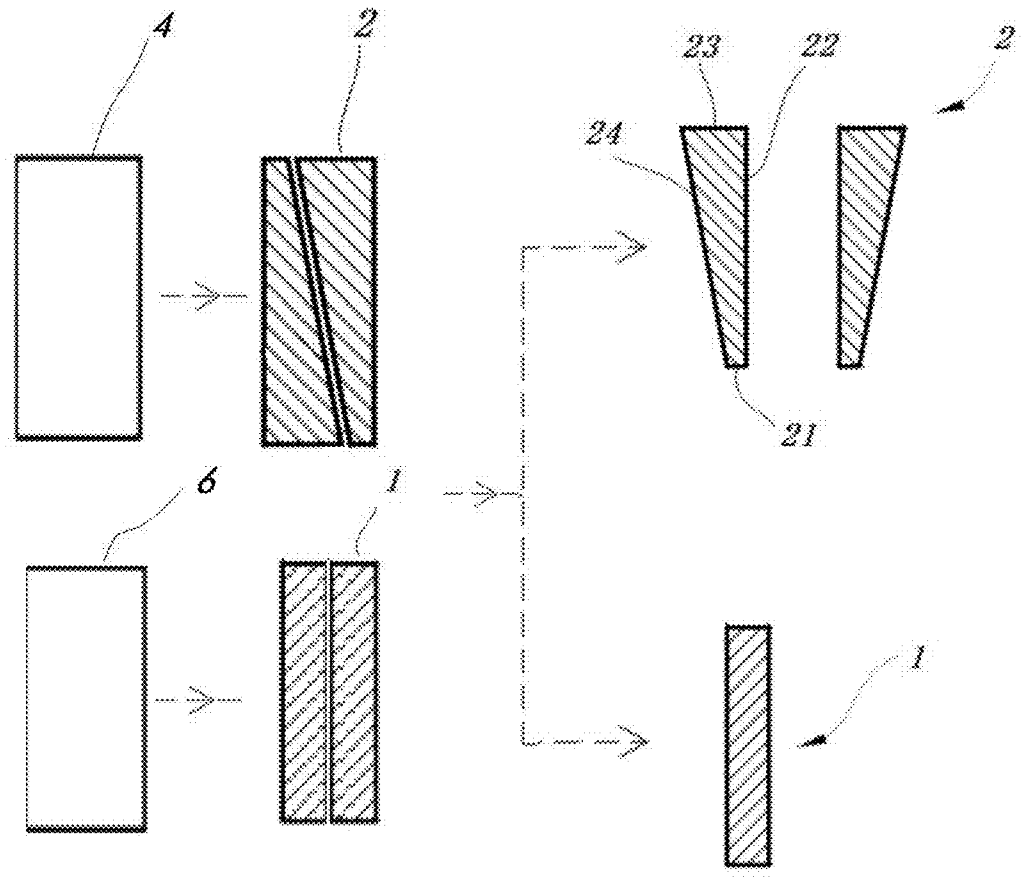
FIG. 10 is a schematic diagram of step a of an armrest production process according to Embodiment 2 of the present disclosure.
Figure 11:
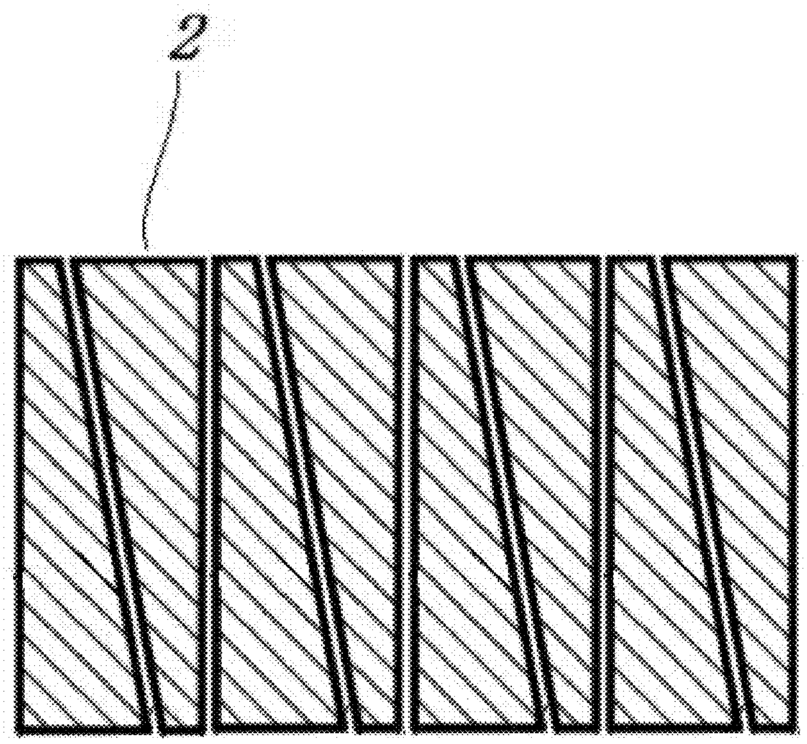
FIG. 11 is a schematic diagram of cutting a first raw material into a plurality of sets of lateral boards according to Embodiment 2 of the present disclosure.

As shown in FIG. 10, in this embodiment, the first raw material 4 has a rectangular cross-section and is cut into two lateral boards 2. First cutting line a, which is an oblique line, is set between the two lateral boards 2. Cutting is performed along the first cutting line a to form the two lateral boards 2 that are separate. The two lateral boards 2 are right trapezoids, and the two lateral boards 2 are inverted. As shown in FIG. 11, in other embodiments, the first raw material 4 can also be cut into a plurality of sets of lateral boards 2. As shown in FIG. 11, the first raw material 4 is cut into four sets of lateral boards. There is a straight cutting line between each two adjacent sets of lateral boards, and there is an oblique cutting line between the two adjacent lateral boards in the same set. The two lateral boards in the same set are right trapezoids, and are inverted to save the wood material.

The two lateral boards 2 are prepared by cutting the same piece of first raw material 4, ensuring that the surface texture, density, luster, color difference, porosity, etc. of the two lateral boards 2 are the same, avoiding surface differences of the finished product and improving the appearance quality of the finished product. The two lateral boards 2 are right trapezoids, and the two lateral boards 2 are inverted. Thus, cutting according to the first cutting line a avoids the need for a large size of the first raw material 4, thereby reducing the material cost.

The woody third raw material 6 is taken and cut into a plurality of upper covers 1. The excess upper cover 1 can be used for another armrest segment.

The steps b to e in this embodiment are the same as those in Embodiment 1.

The above are merely preferred specific implementations of the present disclosure, but the protection scope of the present disclosure is not limited thereto. Any modification or replacement easily conceived by those skilled in the art within the technical scope of the present disclosure should fall within the protection scope of the present disclosure.

What is claimed is:

1. An armrest production process, wherein an armrest comprises a plurality of armrest segments connected longitudinally; and each of the plurality of armrest segments is produced according to the following steps:

step a: taking a woody first raw material; cutting the woody first raw material into one set of lateral boards and an upper cover, wherein the woody first raw material has a rectangular cross-section, and the one set of lateral boards comprises two lateral boards; setting an oblique line between the two lateral boards of the one set of lateral boards as a first cutting line; dividing a first side of the woody first raw material into the upper cover, and dividing a second side of the woody first raw material into the two lateral boards: setting a straight line between the upper cover and the two lateral boards as a second cutting line; and cutting along the first cutting line and the second cutting line to obtain the upper cover and the two lateral boards, wherein the upper cover and the two lateral boards are separate;

step b: taking a woody second raw material, and processing the woody second raw material into an inner core;

step c: splicing the two lateral boards onto two sides of the inner core, respectively;

step d: splicing the upper cover onto an upper surface of the inner core and upper surfaces of the two lateral boards; and step e: processing outer edges of the two lateral boards and an outer edge of the upper cover into an outline of the armrest.

2. The armrest production process according to claim 1, wherein a cross-section of each of the two lateral boards is a right trapezoid, wherein the right trapezoid is enclosed by a short base, a vertical leg, a long base, and an oblique leg; the two lateral boards are inverted such that the oblique legs of the two lateral boards coincide; and the first cutting line forms the oblique leg.

3. The armrest production process according to claim 2, wherein step c further comprises: when the two lateral boards are spliced onto the two sides of the inner core, respectively, connecting the vertical legs of the right trapezoids to the inner core, and positioning the oblique legs of the right trapezoids at the outer edges.

4. The armrest production process according to claim 2, wherein an angle formed by the oblique leg and the vertical leg of each of the two lateral boards is 10°-15°; and a length of the upper cover is L1, and a distance between edges of the two lateral boards is L2, wherein L1<L2.

5. The armrest production process according to claim 1, wherein step d further comprises: processing the upper surfaces and lower surfaces of the two lateral boards and the upper surface and a lower surface of the inner core, such that the upper surfaces of the two lateral boards are flush with the upper surface of the inner core and the lower surfaces of the two lateral boards are flush with the lower surface of the inner core; and splicing the at least one upper cover onto the upper surface of the inner core and the upper surfaces of the two lateral boards.

6. The armrest production process according to claim 5, further comprising: performing plane cutting along the upper surfaces of the two lateral boards and the upper surface of the inner core, with a height of 3 mm-5 mm cut away from an upper portion of the inner core and upper portions of the two lateral boards to allow the upper surfaces of the two lateral boards and the upper surface of the inner core to be flush; and performing plane cutting along the lower surfaces of the two lateral boards and the lower surface of the inner core, with a height of 3 mm-5 mm cut away from a lower portion of the inner core and lower portions of the two lateral boards to allow the lower surfaces of the two lateral boards and the lower surface of the inner core to be flush.

7. The armrest production process according to claim 1, wherein the material grade of the woody first raw material is above a material grade of the woody second raw material.

8. The armrest production process according to claim 7, wherein the material grade of the woody first raw material is AA-grade, and the material grade of the woody second raw material is BB-grade.

9. The armrest production process according to claim 1, further comprising: splicing a plurality of pieces of woody second raw materials into the inner core by bonding, mortise and tenon connection, bolt connection or tooth connection, wherein the woody second raw material is a leftover material, a finger-jointed wood material or a laminated wood material.

* * * * *